(12) United States Patent
Bourgeois et al.

(10) Patent No.: US 11,641,969 B2
(45) Date of Patent: *May 9, 2023

(54) METHOD AND APPARATUS FOR COOKING A SKEWERED FOOD ITEM

(71) Applicant: METAL FUSION, INC., Jefferson, LA (US)

(72) Inventors: Barbara Bourgeois, Jefferson, LA (US); Michael Bourgeois, Kenner, LA (US); Norman Bourgeois, Jr., Jefferson, LA (US); Nicholas Ryan Bourgeois, River Ridge, LA (US)

(73) Assignee: Metal Fusion, Inc., Jefferson, LA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/202,571

(22) Filed: Mar. 16, 2021

(65) Prior Publication Data

US 2021/0267404 A1    Sep. 2, 2021

Related U.S. Application Data

(63) Continuation of application No. 16/421,608, filed on May 24, 2019, now Pat. No. 10,945,551, which is a
(Continued)

(51) Int. Cl.
| | |
|---|---|
| A47J 27/04 | (2006.01) |
| A47J 36/20 | (2006.01) |
| A47J 37/04 | (2006.01) |
| A47J 37/06 | (2006.01) |
| A23L 5/10 | (2016.01) |
| A47J 43/18 | (2006.01) |
| A47J 27/026 | (2006.01) |
| A47J 33/00 | (2006.01) |

(52) U.S. Cl.
CPC .............. *A47J 27/04* (2013.01); *A23L 5/13* (2016.08); *A47J 27/026* (2013.01); *A47J 33/00* (2013.01); *A47J 36/20* (2013.01); *A47J 37/049* (2013.01); *A47J 37/0647* (2013.01); *A47J 37/0664* (2013.01); *A47J 43/18* (2013.01); *A23V 2002/00* (2013.01); *A47J 2027/043* (2013.01)

(58) Field of Classification Search
CPC .. A47J 27/04; A47J 33/00; A47J 36/20; A47J 37/049; A47J 37/0664; A47J 43/18; A47J 2027/043; A23L 5/13
See application file for complete search history.

(56) References Cited

U.S. PATENT DOCUMENTS

| | | | | |
|---|---|---|---|---|
| 1,393,762 A | * | 10/1921 | Demuth | ............... A47J 27/17 |
| | | | | 99/347 |
| 2,821,904 A | * | 2/1958 | Arcabosso | ............ A47J 37/106 |
| | | | | 99/346 |

(Continued)

*Primary Examiner* — Steven N Leff
(74) *Attorney, Agent, or Firm* — Roy Kiesel Ford Doody & North, APLC; Brett A. North (57) ABSTRACT

A turkey cooking apparatus provides a pot and a specially configured insert (e.g., basket) that rests upon the pot bottom. A lower funnel shaped section and upper tube shaped section are provided inside the pot. The insert (e.g., basket) sits upon funnel shaped portion. The insert has a central opening that is receptive of the tubed portion. Both the insert and the tube section can have openings that enable steam to travel upwardly to cook the turkey carcass.

19 Claims, 9 Drawing Sheets

Related U.S. Application Data continuation of application No. 14/329,284, filed on Jul. 11, 2014, now Pat. No. 10,299,621.

(60) Provisional application No. 61/845,216, filed on Jul. 11, 2013.

(56) References Cited

U.S. PATENT DOCUMENTS

| | | | | |
|---|---|---|---|---|
| 6,427,582 | B1 * | 8/2002 | Measom | A47J 43/18 99/426 |
| 7,543,529 | B1 * | 6/2009 | Carpenter | A47J 37/043 99/421 V |
| 7,879,381 | B2 * | 2/2011 | Dow | A47J 36/00 426/523 |
| 2002/0100371 | A1 * | 8/2002 | Snoke | A47J 37/01 99/426 |
| 2011/0226135 | A1 * | 9/2011 | Oswald | A47J 27/04 99/473 |

* cited by examiner

METHOD AND APPARATUS FOR COOKING A SKEWERED FOOD ITEM

CROSS-REFERENCE TO RELATED APPLICATIONS

This is a continuation of U.S. Ser. No. 16/421,608, filed May 24, 2019 (issues as U.S. Pat. No. 10,945,551 on Mar. 16, 2021), which is a continuation of U.S. Ser. No. 14/329,284, filed Jul. 11, 2014 (issued as U.S. Pat. No. 10,299,621 on May 28, 2019), which claims the benefit of U.S. Provisional Patent Application Ser. No. 61/845,216, filed Jul. 11, 2013, each of the above applications/patents being incorporated herein by reference in their entirety, and priority of/to each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cooking devices such as pots and inserts used to cook poultry items such as turkeys, chickens and the like. Even more particularly, the present invention relates to an improved cooking apparatus that employs a pot with a pot side wall and bottom panel that includes a specially configured funnel and tube section, the pot being specially configured to support a basket at the lower end portion of the pot. The tube section extends from the funnel shaped lower end upwardly so that it skewers a poultry carcass (e.g., turkey, chicken) to be cooked and wherein the carcass also rests upon the basket.

2. General Background of the Invention

Many types of cooking devices have been patented. Some are designed to fry a turkey or other poultry article in an oil such as peanut oil. Examples of outdoor cookers are found in the following table, which are hereby incorporated herein by reference:

| Pat. No. | Title | Issue Date |
| --- | --- | --- |
| 6,314,869 | Outdoor Cooking Apparatus | Nov. 13, 2001 |
| 6,439,107 | Gas Fired Outdoor Cooking Apparatus | Aug. 27, 2002 |
| 6,698,335 | Gas Fired Outdoor Cooking Apparatus | Mar. 2, 2004 |
| 6,957,649 | Gas Fired Outdoor Cooking Apparatus | Oct. 25, 2005 |
| 6,964,273 | Outdoor Cooking Apparatus | Nov. 15, 2005 |
| 7,237,476 | Outdoor Cooking Apparatus | Jul. 3, 2007 |
| 7,237,547 | Outdoor Cooking Apparatus | Jul. 3, 2007 |
| 7,325,482 | Outdoor Cooking Apparatus | Feb. 5, 2008 |
| 7,640,848 | Gas Fired Outdoor Cooking Apparatus that Includes Pot with Spigot Drain | Jan. 5, 2010 |
| 7,703,386 | Smoker Apparatus | Apr. 27, 2010 |
| 7,707,929 | Outdoor Cooking Apparatus | May 4, 2010 |
| 7,766,004 | Outdoor Cooking Apparatus | Aug. 3, 2010 |
| 7,770,514 | Outdoor Cooking Apparatus | Aug. 10, 2010 |
| 8,001,955 | Backpacking Stove Pot and Apparatus | Aug. 23, 2011 |
| 8,001,956 | Outdoor Cooking Apparatus With Removable Heat Shield | Aug. 23, 2011 |
| 8,020,546 | Teppanyaki Grill | Sep. 20, 2011 |
| 8,127,757 | Outdoor Cooking Apparatus | Mar. 6, 2012 |
| 8,272,375 | Backpacking Stove Pot and Apparatus | Sep. 25, 2012 |
| 8,459,247 | Outdoor Cooking Apparatus With Removable Heat Shield | Jun. 11, 2013 |

One problem with the oil frying of a turkey is that it can be an expensive proposition. For example, the cost of peanut oil is in most cases more expensive than the turkey itself.

BRIEF SUMMARY OF THE INVENTION

The apparatus of the present invention solves the prior art problems and shortcomings by providing a turkey or poultry cooking device that employs steam and thus not requiring expensive oil such as peanut oil.

The present invention includes a turkey cooking apparatus, comprising a pot that can have a bottom panel, a side wall and an open top. A lower funnel shaped section and an upper tube shaped section are provided. A removable support can rest upon the pot bottom, the removable support can have a central opening that is receptive of the tube shaped section. The removable support and tube shaped section can each have a plurality of openings. A burner (e.g., see U.S. Pat. Nos. 6,314,869, 6,439,107 and 6,698,335, each hereby incorporated herein by reference) can support the pot for transferring heat thereto. The pot can have a liquid or water or marinade or other cooking medium holding section that is above the pot bottom and below the removable support.

In one embodiment, the side wall can be generally cylindrically shaped.

In one embodiment, the pot can have a square cross section.

In one embodiment, the pot can have a rectangular cross section.

In one embodiment, the funnel shaped section can be at the pot bottom panel.

In one embodiment, the funnel shaped section can be perforated with openings.

In one embodiment, the apparatus further comprises a lid that can have a central opening that is receptive of the tube section.

In one embodiment, the combination of the removable support and turkey can be removed together from the pot when cooling is completed.

In one embodiment, a burner can be placed below the funnel shaped section.

In one embodiment, the burner diameter can be equal to or smaller than the maximum funnel diameter.

The present invention can include a turkey or poultry cooking apparatus, comprising a pot that can have an open top, a bottom panel, a side wall, an upper end portion and a lower end portion and a pot interior. A removable support can be sized and shaped to fit the pot interior. A funnel portion and a tube portion are provided. The funnel portion can be at the pot bottom panel and the tube portion can extend above the open top. A lid can be removably attached to the pot open top, the lid can have an opening that is receptive of the tube portion. The removable support and tube shaped section can each have a plurality of openings. A burner can support the pot for transferring heat thereto, the pot can have a liquid or water or marinade or other cooking medium holding section that is above the pot bottom and below the removable support when cooling a poultry or like article.

The present invention can include a turkey cooking apparatus, comprising a pot that can have a bottom panel, a side wall, an interior and an open top. The pot can support a lower funnel shaped section and an upper tube shaped section. A removable support can fit the pot interior. A central opening on the removable support can be receptive of the tube shaped section. The removable support and tube shaped section can each having a plurality of openings. A burner can support the pot for transferring heat thereto, the pot can have a liquid or water or marinade holding section that can be above the pot bottom and below the removable support.

In one embodiment, the funnel shaped section can be positioned at the pot bottom panel.

In one embodiment, the removable support can have a bottom panel that can be perforated with openings.

In one embodiment, the removable support can have a side wall that can be provided with openings.

In one embodiment, the pot bottom can have an area and the funnel shaped section that can occupy a majority of the area.

In one embodiment, the combination of the removable support and turkey can be removable together from the pot.

In one embodiment, the burner can be placed below the funnel shaped section in a cooking position.

In one embodiment, the burner diameter can be equal to or smaller than the funnel diameter.

In one embodiment, steam can be created and percolates through the removable support and tube openings during cooking.

In one embodiment, steam can be created and percolates through the openings in the tube shaped section during cooking.

The present invention can include a turkey cooking apparatus, comprising a pot that can have an open top, a bottom panel, a side wall, an upper end portion, a lower end portion, and a ridge provided on the pot upper end portion. The pot can support a funnel portion and a tube portion. A removable support can be removably supported within the pot, the removable support can have an opening that can be receptive of the tube portion. A lid can be removably attached to the pot open top, the lid having an opening that can be receptive of the tube portion. The removable support and tube portion can each have a plurality of openings. A burner can support the pot for transferring heat thereto, the pot having a liquid or water or marinade or other cooking medium holding section that can be above the pot bottom and below the removable support. The removable support can include a food holder portion that is configured to hold a turkey carcass at a position elevated above all or part of the water holding section.

In one embodiment, the funnel portion can be perforated with openings.

In one embodiment, the apparatus further comprises handles on the removable support.

In one embodiment, the funnel portion can be a part of the pot bottom.

In one embodiment, the combination of the removable support and turkey can be removable together from the pot.

In one embodiment, the burner can be placed vertically below the funnel portion.

In one embodiment, the burner diameter can be equal to or smaller than the funnel maximum diameter.

In one embodiment, steam can be created and percolates through openings in the removable support during cooking.

In one embodiment, steam can be created and percolates through the openings in the tube portion during cooking.

In one embodiment, the removable support can be a basket.

In one embodiment, the removable support can be a plate.

The present invention includes a method of cooking a food item, comprising the steps of providing a cooker. The method provides a pot that can have a bottom panel, a side wall, an interior and an open top. The pot can support a lower funnel shaped section and an upper tube shaped section. A removable support can fit the pot interior. A central opening on the removable support can be receptive of the tube shaped section. The removable support and tube shaped section can each have a plurality of openings. A burner can support the pot for transferring heat thereto, the pot can have a cooking fluid section that is above the pot bottom and below the removable support.

The method further provides inserting a food item over the tube shaped opening such that the food item blocks a first plurality of the openings. A cooking fluid can be added into the pot interior. The pot can be heated such that convective air currents are forced through the interior of the tube and exit a plurality of the openings into the interior of the pot. The pot can be heating such that at least part of the cooking fluid can be changed into vapor and rising above the level of the food time inserted, and can exit the interior of the pot through a plurality of the openings in the tube.

In one embodiment, vapor can pass at least partly through the food item being cooked before exiting the interior of the pot through a plurality of the openings in the tube.

In one embodiment, the invention further comprises the step of heating the food item inserted to create heated vapor originating from the food item and exiting the interior of the pot through a plurality of the openings in the tube.

In one embodiment, the cooking fluid can have a cooking fluid level that can be below the food item inserted.

In one embodiment, the removable support can include a food holder portion that can be configured to hold a turkey carcass at a position elevated above all or part of the cooking fluid section.

Various embodiments include a method of cooking a food item using various embodiments of the cooker described herein.

In various embodiments the method includes the step of skewering a food item to be cooked on the tube shaped section of the pot such that the tube shaped section vertically supports the food item to be cooked in the pot, and the tube shaped section proves a flow pathway from a cooking heat source, through and past the food item to be cooked, along with having this flow path being in fluid/flow communication with the interior of the food item to be cooked. In various embodiments the tube shaped section includes a plurality of holes/openings/apertures in the tube wall, and the food item to be cooked covers a plurality of the holes/openings/apertures when the food item to be cooked is placed on the tube shaped section. In various embodiments the food item to be cooked covers only a subset of the plurality of holes/openings/apertures in the wall of the tube shaped section. In various embodiments the food item to be cooked covers holes/openings/apertures at the lower end of the tube shaped section, but leaves uncovered holes/openings/apertures at the upper end of the tube shaped section. In various embodiments the food item to be cooked covers holes/openings/apertures at the upper end of the tube shaped section, but leaves uncovered holes/openings/apertures at the lower end of the tube shaped section. In various embodiments the food item to be cooked covers holes/openings/apertures in the middle portion of the tube shaped section, but leaves uncovered holes/openings/apertures at both the upper and the lower ends of the tube shaped section.

In various embodiments the method further includes the step of heated air flow from the interior of the tube shaped section entering the interior of the food item to be cooked through a plurality of holes/openings/apertures. In various embodiments the method further includes the step of heated air flow from the interior of the food item to be cooked entering the interior of the tube shaped section through a plurality of holes/openings/apertures. In various embodiments the method further includes the step of heated air flow from the interior of the tube shaped section entering the interior of the food item to be cooked through a plurality of holes/openings/apertures, along with heated air flow from the interior of the food item to be cooked entering the interior of the tube shaped section through a plurality of holes/openings/apertures.

In various embodiments the amount of covered holes/openings/apertures by the food item to be cooked can be about at least 25, 30, 35, 40, 45, 50, 55, 60, 65, 70, 75, 80, 85, 90, 95, 99, and/or 100 percent of the entire amount of holes/openings/apertures in the wall of the tube shaped section. In various embodiments the plurality of holes/openings/apertures covered can between any two of the above specified percentages of the covered holes/openings/apertures. In various embodiments the flow between the interior of the food item to be cooked and the interior of the tubed shaped section is made using each of the covered plurality of holes/openings/apertures.

In various embodiments the method includes the steps of skewering a food item to be cooked on the tube shaped section of the pot such that the tube shaped section vertically supports the food item to be cooked in the pot, and the tube shaped section proves a flow pathway from a cooking heat source, through and past the food item to be cooked, along with having this flow path being in fluid/flow communication with the interior of the food item to be cooked, and placing a lid on the pot. In various embodiments the method includes the further steps of adding a cooking fluid to the interior of the pot to reach a predefined level. In various embodiments the predefined level is below the bottom of the food item to be cooked. In various embodiments the level is above the bottom of the food item to be cooked but below the level of the lowermost hole/opening/aperture in the tube shaped member that it not covered by the food item to be cooked when the food item is placed on the tube shaped member.

In various embodiments the user has various options in selecting the percent of reduction and/or percent of enlargement of the outlet size (as will be described hereafter) during the cooking process for first and/or second predefined periods of time. In various embodiments the method further includes the step of during the cooking process changing the upper exhaust/outlet size of the tube shaped member which restricts the amount of exiting flow compared to a non-restricted outlet size. In various embodiments the method further includes the step of, after heat has been applied to the bottom of the pot and after a first predefined time period, reducing the outlet size to a predefined outlet size. In various embodiments the method also includes after a second predefined period of time which is greater than the first predefined period of time, enlarging the outlet size of the previously restricted outlet size. In various embodiments after the first period of time the outlet can be enlarged and after the second period of time the outlet can be reduced.

In various embodiments the method further includes the step of, during the cooking process, changing the quantity and/or identity of the plurality of holes/openings/apertures in the tube shaped member in which fluid communication between the interior and exterior of the tube shaped member are not allowed, which holes/openings/apertures are not covered by the food item to be cooked, but which holes/openings/apertures are instead blocked by a blocking member such as a restrictor/blocking sleeve (as will be described hereafter). Such changes in quantity and/or identity of blocking holes/openings/apertures with a restrictor/blocking sleeve allows a user the option of customizing the quantity and identity of blocked holes/openings/apertures in the tube shaped member used during the cooking process (and also thereby customizing the quantity and/or identity of non-blocked holes/openings/apertures). The set of blocked holes/openings/apertures can be moved in a vertical direction by vertical movement of the restrictor/blocking sleeve. Movement can be done during the cooking process, and either when the lid on the pot is closed or when the lid on the pot is removed. In various embodiments, the method further includes the step of, after heat has been applied to the bottom of the pot and after a first predefined period of time during the cooking process, vertically moving the restrictor/blocking sleeve relative to the tube shaped member to change the quantity and/or identity of the plurality of holes/openings/apertures in the tube shaped member in which fluid communication with the interior of the tube shaped member are blocked. In various embodiments the quantity and/or identity of holes/openings/apertures that are blocked can be either moved either up or down vertically by vertically moving up or down the restrictor/blocking sleeve member. In various embodiments the method also includes, after a second predefined period of time which is greater than the first predefined period of time during the cooking process, again changing the quantity and/or identity of the plurality of holes/openings/apertures in the tube shaped member in which fluid communication with the interior of the tube shaped member are blocked by again vertically moving the restrictor/blocking sleeve relative to the tube shaped member during the cooking process. In various embodiments the restrictor/blocking sleeve can either be moved up or down. In various embodiments the location of the restrictor/blocking sleeve can be reset during cooking by relocating a sleeve support connector from a first hole/opening/aperture in the tube shaped member to a second hole/opening/aperture in the tube shaped member. In various embodiments the top of the restrictor/blocking sleeve can be below the bottom of the lid during cooking. In various embodiments the top of the restrictor/blocking sleeve can be above the bottom of the lid during cooking. In various embodiments the top of the restrictor/blocking sleeve can be moved from below to above the bottom of the lid during cooking. In various embodiments the top of the restrictor/blocking sleeve can be moved from above to below to above the bottom of the lid during cooking.

In various embodiments the method further includes the step of, during the cooking process, changing the identity and/or location of the plurality of holes/openings/apertures in the tube shaped member in which fluid communication between the interior and exterior of the tube shaped member are not allowed, which holes/openings/apertures are not covered by the food item to be cooked, but which holes/openings/apertures are instead blocked by a blocking member such as a restrictor/blocking sleeve (as will be described hereafter). Such changes in identity and/or location of blocking holes/openings/apertures with a restrictor/blocking sleeve allows a user the option of customizing the identity and location of blocked holes/openings/apertures in the tube shaped member used during the cooking process (and also thereby customizing the identity and/or location of non-blocked holes/openings/apertures). The set of blocked holes/openings/apertures can be moved in a vertical direction by vertical movement of the restrictor/blocking sleeve. Movement can be done during the cooking process, and either when the lid on the pot is closed or when the lid on the pot is removed. In various embodiments, the method further includes the step of, after heat has been applied to the bottom of the pot and after a first predefined period of time during the cooking process, vertically moving the restrictor/blocking sleeve relative to the tube shaped member to change the identity and/or location of the plurality of holes/openings/apertures in the tube shaped member in which fluid communication with the interior of the tube shaped member are blocked. In various embodiments the identity and/or location of holes/openings/apertures that are blocked can be either moved either up or down vertically by vertically moving up or down the restrictor/blocking sleeve member. In various embodiments the method also includes, after a second predefined period of time which is greater than the first predefined period of time during the cooking process, again changing the identity and/or location of the plurality of holes/openings/apertures in the tube shaped member in which fluid communication with the interior of the tube shaped member are blocked by again vertically moving the restrictor/blocking sleeve relative to the tube shaped member during the cooking process. In various embodiments the restrictor/blocking sleeve can either be moved up or down. In various embodiments the location of the restrictor/blocking sleeve can be reset during cooking by relocating a sleeve support connector from a first hole/opening/aperture in the tube shaped member to a second hole/opening/aperture in the tube shaped member. In various embodiments the top of the restrictor/blocking sleeve can be below the bottom of the lid during cooking. In various embodiments the top of the restrictor/blocking sleeve can be above the bottom of the lid during cooking. In various embodiments the top of the restrictor/blocking sleeve can be moved from below to above the bottom of the lid during cooking. In various embodiments the top of the restrictor/blocking sleeve can be moved from above to below to above the bottom of the lid during cooking.

In various embodiments the location of the restrictor/blocking sleeve can be set at a vertically spaced apart distance from the top of the food item being cooked which can customize the amount and location of holes/openings/apertures located close to the tope of the food item being cooked in which flow is allowed between the interior of tube shaped member and the interior of the pot during cooking. In various embodiments the location of the restrictor/blocking sleeve can be set and/or reset during cooking by positioning and/or relocating a sleeve support connector in a first hole/opening/aperture in the tube shaped member in the tube shaped member and/or from the first hole/opening/aperture to a second hole/opening/aperture in the tube shaped member.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 11:
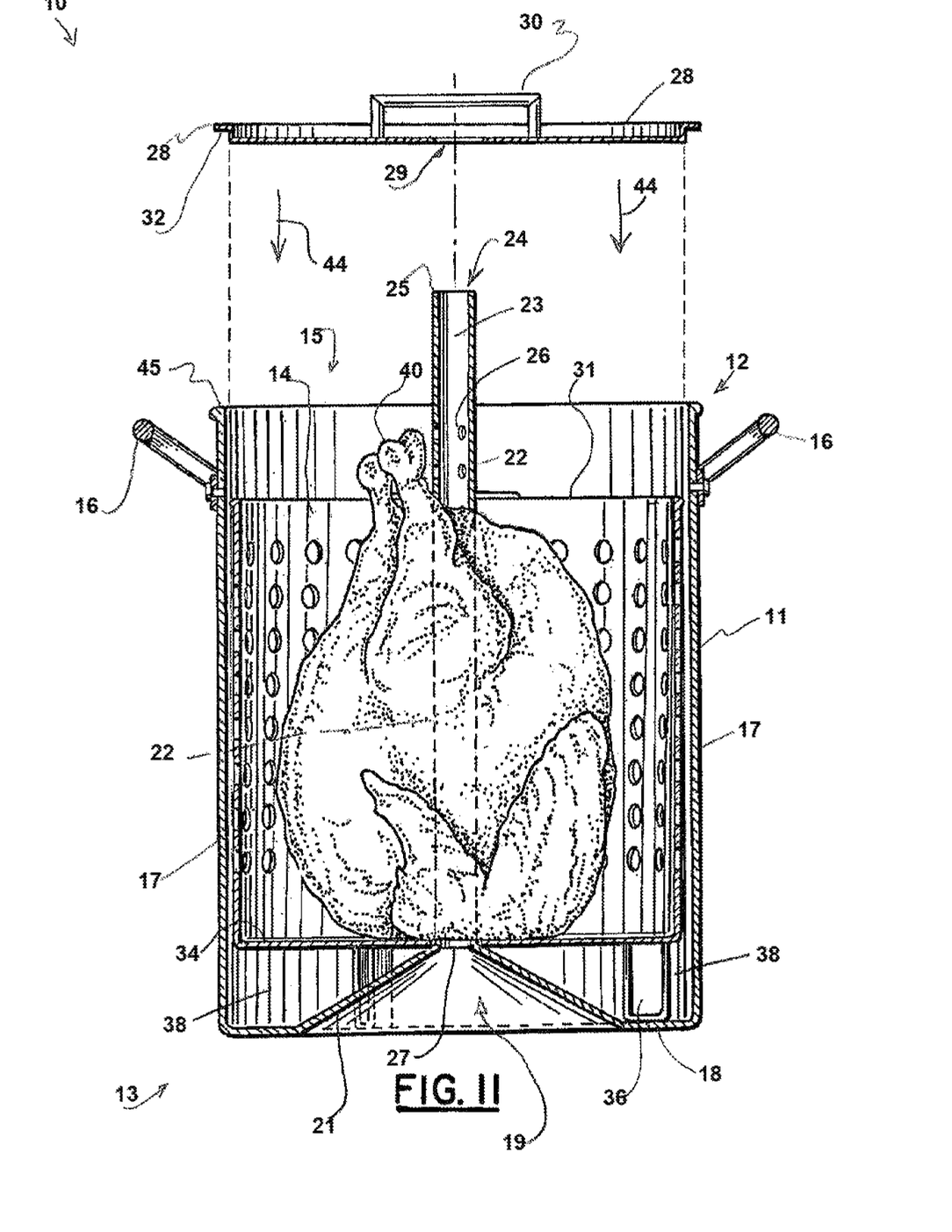
FIG. 11 is a sectional elevation view of a preferred embodiment of the apparatus of the present invention.

FIGS. 1-11 show a preferred embodiment of the apparatus of the present invention designated generally by the numeral 10 in FIG. 11. The apparatus 10 provides a pot 11 that can be generally cylindrically shaped, or can have a square or rectangular cross section.

Figure 1:
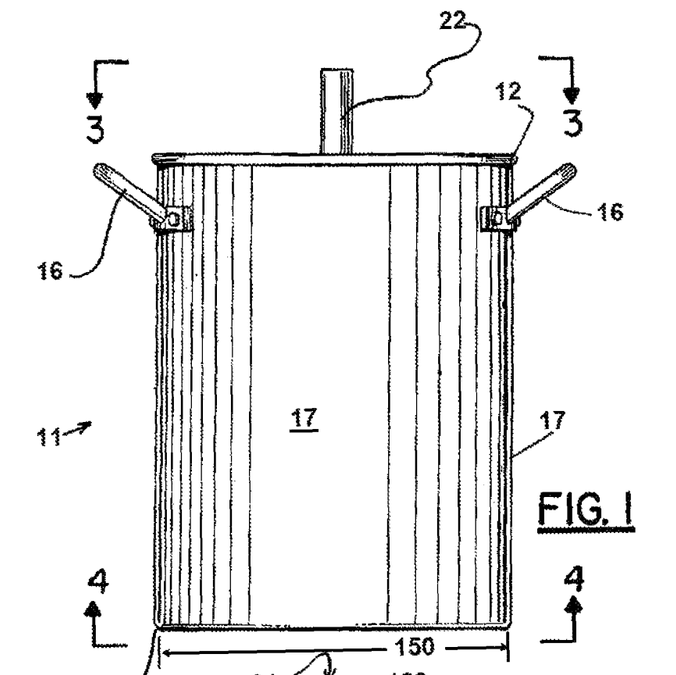
FIG. 1 is an elevation view of a preferred embodiment of the apparatus of the present invention.
Figure 2:
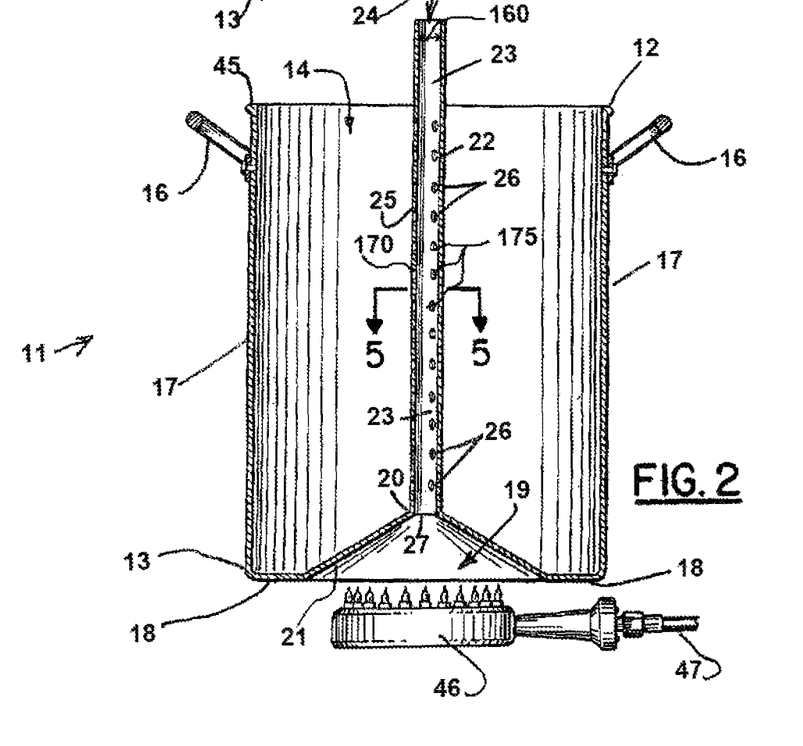
FIG. 2 is a sectional elevation view of a preferred embodiment of the apparatus of the present invention taken along lines 2-2 of FIG. 3.
Figure 3:
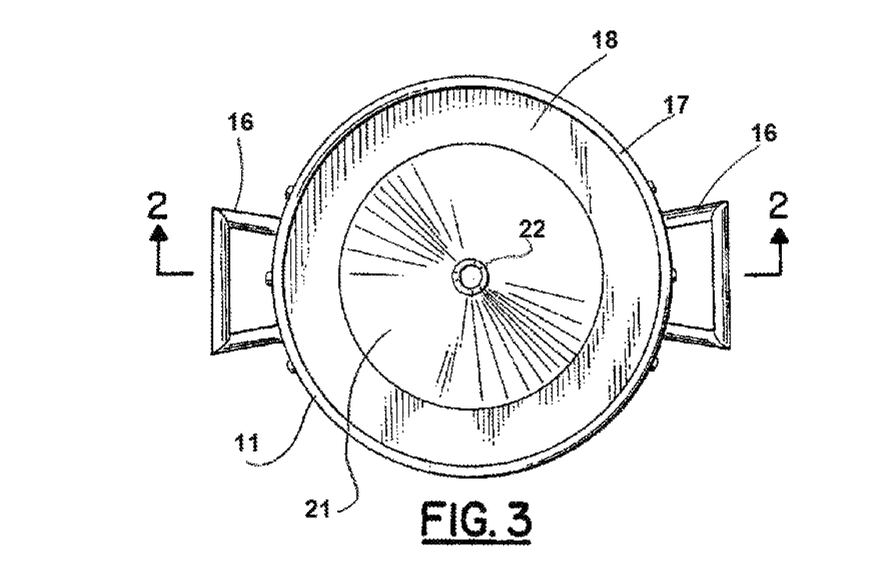
FIG. 3 is an top view of a preferred embodiment of the apparatus of the present invention taken along lines 3-3 of FIG. 1.
Figure 4:
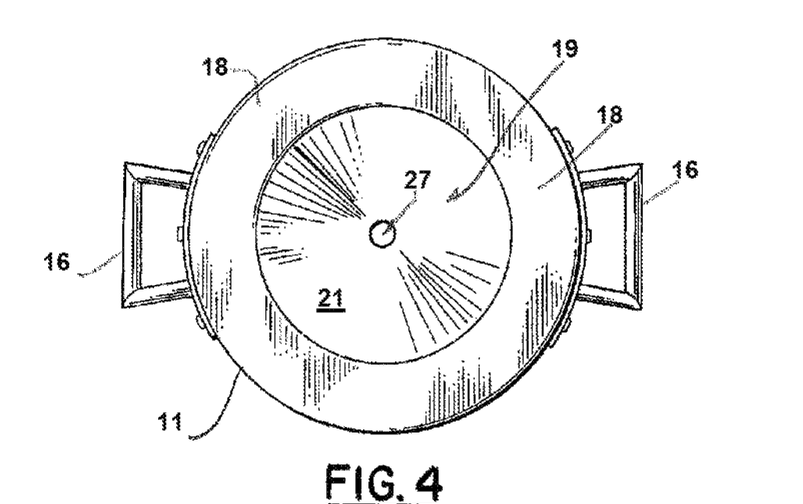
FIG. 4 is a bottom view of a preferred embodiment of the apparatus of the present invention taken along lines 4-4 of FIG. 1.
Figure 5:
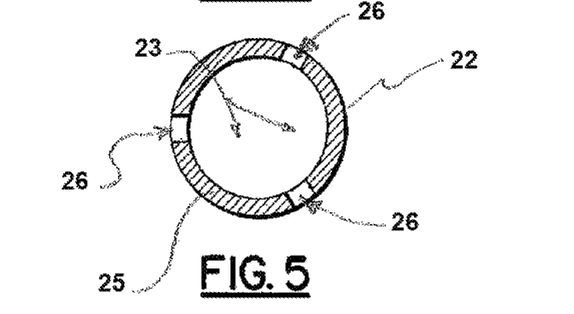
FIG. 5 is a partial sectional view of a preferred embodiment of the apparatus of the present invention taken along lines 5-5 of FIG. 2.

The pot 11 provides an upper end portion 12, lower end portion 13, an interior 14 and an open top 15 that can be fitted with lid or closure 28. Pot 11 has a side wall 17 that can be generally cylindrically shaped. Alternatively, the pot can have a square or rectangular cross section with multiple side walls. Side wall 17 has attached handles 16. Burner 46 is placed under pot 11 and centered under funnel section 21 as seen in FIG. 2.

Pot 11 can include an interior tube 22 which fluidly connects the lower end 13 and the upper end 12 of pot 11. Interior tube 22 can includes tube wall 25, tube bore/interior 23, with tube wall having a plurality of holes/openings/apertures 26 along at least part of its height. The plurality of holes/openings/apertures 26 can be of substantially the same size or of different sizes.

The amount of open flow path between interior 23 of tube 22 and interior 14 of pot 11 can impact the cooking time, moisture content, etc. of item of food being cooked inside of pot 11. Tube 22 can have a surface area 170 located in the interior of pot 11 which is calculated up to the level of rim 45. The plurality of holes/openings/apertures 26 can each include a particular cross sectional open area 175,175',175", 175''', etc. In various embodiments the aggregate total of cross sectional open areas 175,175',175",175''', etc. of the plurality of holes/openings/apertures 26 can be about at least 5, 10, 15, 20, 25, 30, 35, 40, 45, 50, 55, 60, 65, 70, 75, 80, 85, 90, 95, and/or 99 percent of the surface area 170 of interior tube 22 found inside of interior 14 of pot 11. In various embodiments the aggregate total of all cross sectional open areas 175,175',175",175''', etc. of the plurality of holes/openings/apertures 26 can be between any two of the above specified percentages of the surface area of interior tube 22.

Also potentially impacting cooking is the relative size between tube internal bore 23 and the interior 14 of pot. Internal bore 23 has a diameter 160 and pot 11 has a diameter 150. In various embodiments the diameter 160 of internal bore 23 can be about at least 1, 2, 3, 4, 5, 7, 8, 10, 12, 14, 15, 16, 18, 20, 25, 30, 35, 40, 45, and/or 50 percent of the diameter 150 of pot 11. In various embodiments the diameter 160 can be between any two of the above specified percentages of the diameter 150 of pot 11.

The plurality of holes/openings/apertures 26 can be spaced about at least a portion of the height of interior tube 22, and in alternative embodiments about the entire height. In various embodiments the plurality of holes/openings/apertures 26 can be spaced about at least 25, 30, 35, 40, 45, 50, 55, 60, 65, 70, 75, 80, 85, 90, 95, 99, and/or 100 percent of the height of interior tube 22. In various embodiments the plurality of holes/openings/apertures 26 can be spaced about the height of the interior of tube 22 between any two of the above specified percentages of the height.

In various embodiments plurality of holes/openings/apertures 26 can be about of substantially equal size about the vertical height of tube 22 over which they span. In various embodiments plurality of holes/openings/apertures 26 can vary in size about the vertical height of tube 22 over which they span: (a) increasing in size from lower to higher heights; (b) decreasing in size from lower to higher heights; and (c) randomly sizing from lower to higher heights. Changing the sizes of plurality of holes/openings/apertures 26 can be used to control heated flow into and out of interior 23 of tube 22 about its height.

In various embodiments diameter 430 of tube 22 can be about of substantially equal size about the vertical height of tube 22 located. In various embodiments diameter 430 can vary in size about the vertical height of tube 22: (a) increasing in size from lower to higher heights; (b) decreasing in size from lower to higher heights; and (c) randomly changing in size from lower to higher heights. Changing the size of the diameter 430 of tube 22 can be used to control heated flow into and out of interior 23 of tube 22 about its height.

Pot 11 can include a funnel section 21 which is fluidly connected to the tube bore 23 of interior tube 22. Funnel section 21 can include an opening or concavity 19 so that heat transfer is directly received from the burner 46 to the funnel section 21 and then transferred to tube bore 23. Funnel section 21 is shown as being frustoconical, however, other shapes can work for funnel section 21, such as recessed, cylindrically recesses, rectilinear recessed, triangularly recessed, polygonally recesses. The walls of funnel section are shown as being tapered towards lower tube opening 27, which is preferred construction. Alternatively, the walls of funnel section can be parallel to side wall 17 of pot 11 with an upper ceiling area to funnel section 21 which is connected to tube bore 23. In such a case of parallel walls, it is intended that the lower opening/concavity of funnel section 21 extend above the bottom 13 of pot 11—so that so that heat transfer from burner 46 is directed from the burner 46 by funnel section 21 for transfer to tube bore 23.

Fuel supply hose 47 can be attached to burner 46. Burner 46 can have a maximum diameter that is equal to or less than the maximum diameter of funnel section 21 as seen in FIG. 2. Burner 46 can have a diameter that is about equal to or smaller than the maximum diameter of pot 11.

Figure 6:
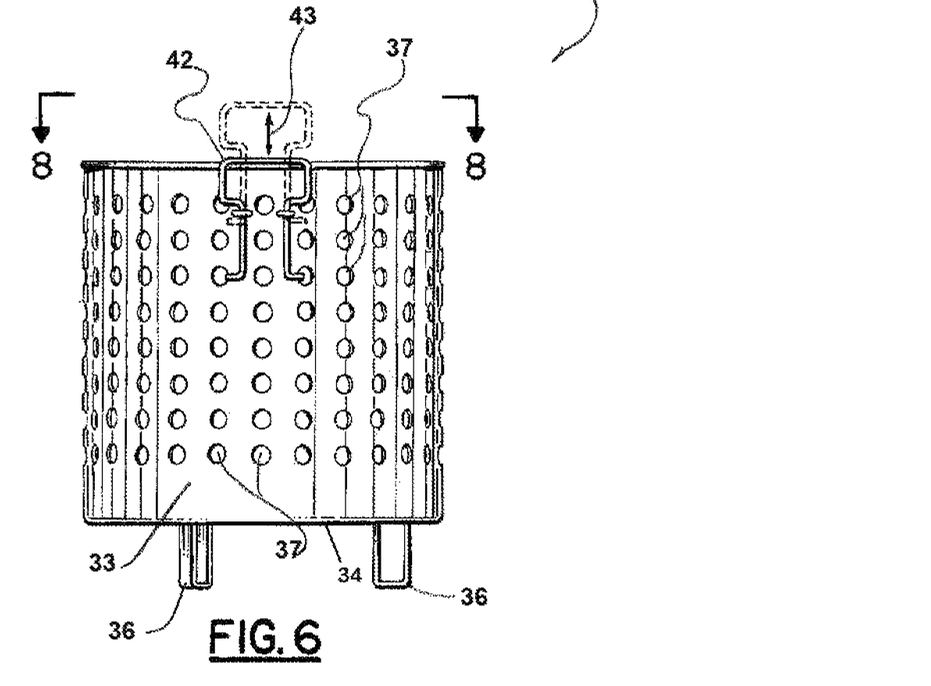
FIG. 6 is a partial elevation view of a preferred embodiment of the apparatus of the present invention.
Figure 7:
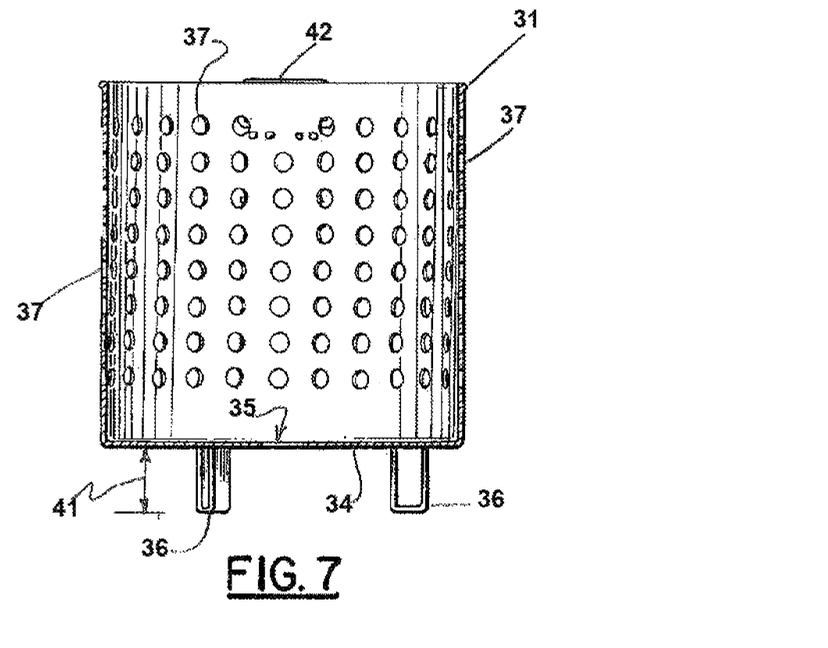
FIG. 7 is a partial sectional view of a preferred embodiment of the apparatus of the present invention taken along lines 7-7 of FIG. 8.
Figures 8, 9:
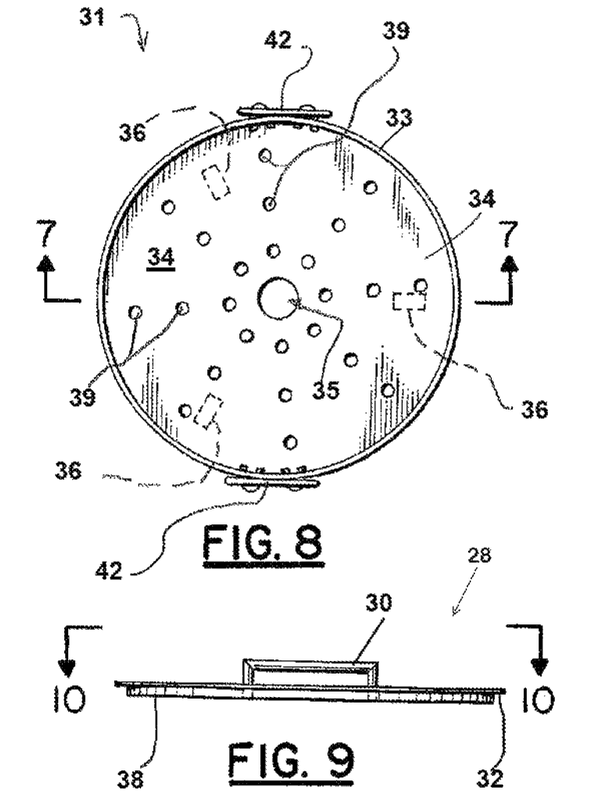
FIG. 8 is a partial top view of a preferred embodiment of the apparatus of the present invention taken along lines 8-8 of FIG. 6.
FIG. 9 is a side fragmentary side view of a preferred embodiment of the apparatus of the present invention showing the lid.
Figure 10:
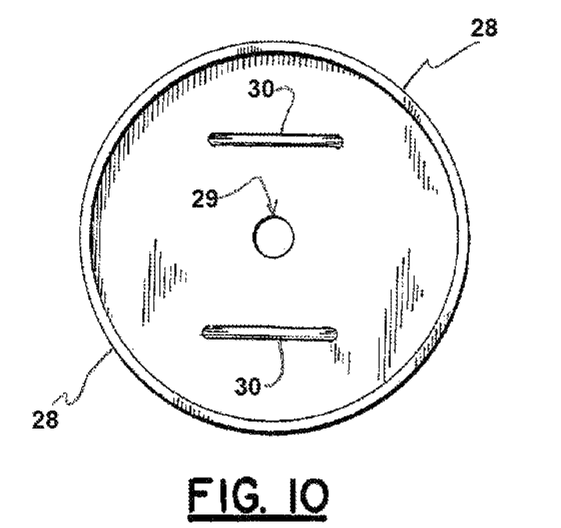
FIG. 10 is a partial top view of a preferred embodiment of the apparatus of the present invention taken along lines 10-10 of FIG. 9.

FIGS. 6-8 illustrate a removable support such as a basket 31 that is an insert sized and shaped to fit inside pot 11 as seen in FIG. 11. Basket 31 has a basket side wall 33 and basket bottom panel 34. A plurality of legs 36 are affixed to the undersigned of basket bottom panel 34 as seen in FIGS. 6-8. The basket bottom panel 34 has a central opening 35 that is sized and shaped to receive tube section 22 as seen in FIG. 11.

Basket 31 can have a pair of handles 42 attached to side wall 33 as seen in FIGS. 6 and 7. Basket handles 42 can be movable between upper and lower positions as indicated by arrow 43 in FIG. 6. The lower position of handle 42 can be seen in FIG. 7.

Basket side wall 33 is provided with a plurality of openings 37. Similarly, basket bottom panel 34 is provided with a plurality of openings 39. Each leg 36 has a length 41 that spaces basket bottom panel 34 a distance such as a few inches above pot bottom panel 18 as shown in FIG. 11.

In FIG. 7, the length of the leg is shown by arrow 41. This distance 41 also represents the depth of liquid or water or marinade or other cooking medium that would be contained within pot 11, interior 14 when cooking a poultry article such as a turkey, designated generally by the numeral 40 in FIG. 11.

Tube section 22 can be cylindrically shaped. Tube section 22 provides an open ended tube bore 23 that extends between open top 24 and lower tube opening 27. The tube section 22 has a tube wall 25 that is perforated with a number of holes, openings or aperture 26. Tube section 22 lower opening 27 can be connected to funnel section 21 at connection 20.

The maximum diameter of the burner 46 is preferably equal to or smaller than the diameter of the funnel section 21 at its largest diameter. The funnel section 21 has an opening or concavity 19 so that heat transfer is directly received from the burner 46 to the funnel section 21

The tube section 22 can extends through a central opening 35 in basket 31. Lid 28 can provide a central opening 29 that also enables tube section 22 to pass through it as shown in FIGS. 10-15. In FIG. 11, arrows 44 illustrate that lid 28 annular shoulder 32 rests against pot rim 45. Tube section 22 extends through opening 29 of lid 28 when the lid 28 is used to close pot 11 open top 15. Lid 28 can be fitted with a pair of handles 30. Lid 28 has annular shoulder 32 that fits pot 11 upper end 12 at rim 45 when lid 28 is put on pot 11 rim 45.

In order to cook a poultry article 40 such as a turkey carcass 40, a user places a volume of fluid 38 below basket 31 bottom panel 34. Burner 46 is placed under pot 11 and particularly below the funnel section 21 (see FIG. 2).

Figure 12:
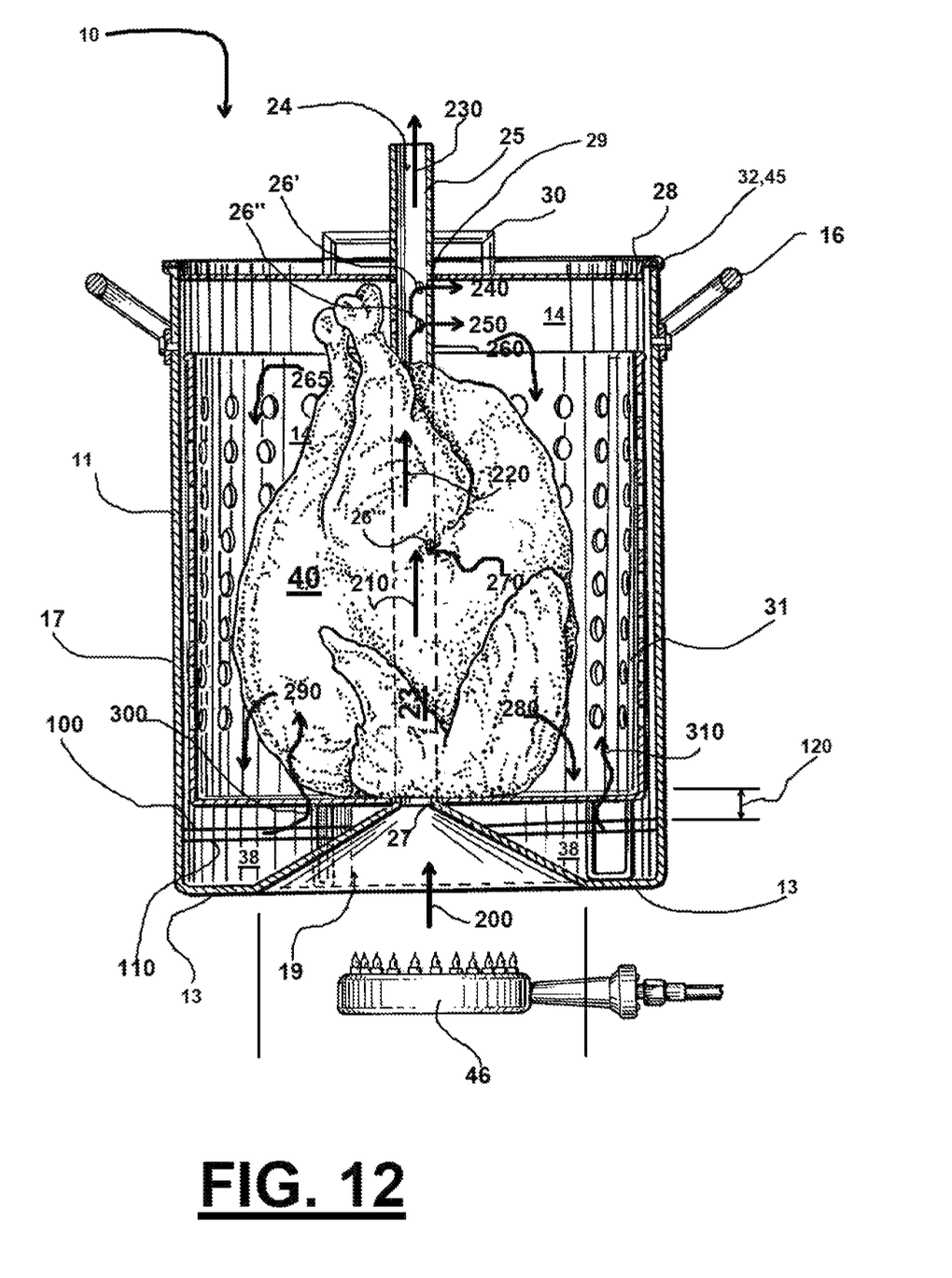
FIG. 12 is a schematic diagram illustrating one embodiment of a method of cooking a food item with one embodiment of the apparatus.

A user adds liquid or water or marinade or other cooking medium to pot 11 interior 14 until the liquid reaches the bottom panel 34 of basket 31. FIG. 12 is a schematic diagram illustrating one embodiment of a method of cooking a food item 40 with one embodiment of the apparatus. In FIGS. 11 and 12, the numeral 38 designates a volume of liquid or water or marinade or other cooking medium that fills pots 11 interior 14 below basket 31 bottom panel 34 to a level 110. In another embodiment, the basket can be configured to hold a turkey carcass at a position elevated above all or part of the liquid or water holding section/level. Level 100 indicates a higher level of a lower specific gravity fluid (above level 110) such as liquid from droppings from food item 40 (schematically illustrated by arrows 280, 290).

FIG. 11 shows the cooking position of the turkey 40 just prior to cooking. Basket 31 has legs 36 which rest upon pot 11 bottom panel 18. Tube section 22 going through turkey 40 acts as a skewer. The turkey carcass 40 can be skewered upon tube section 22 as shown. The turkey carcass 40 or other poultry article 40 also rests upon basket bottom panel 34 as shown.

During cooking, pot lid or closure 28 is placed upon pot 11 upper section 12 to seal open top 15. Lid 28 provides central opening 29 that is threaded over tube section 22. In another embodiment lid 28 can be slidable relative to tube section 22.

In a cooking position, annular shoulder 32 of pot lid 28 rests upon upper annular rim 45 of pot 11. Tube section 22 acts as a vent with heated air exiting pot interior 14 via tube bore 23 and tube open top 24.

Burner 46 heating of liquid or other cooking medium 38, such as water (volume of fluid 38), causes cooking medium 38 to boil in the area below basket 31 creating steam. Cooking medium 38 is schematically shown in FIG. 12 at level 110, with arrow 310 schematically indicating vapor rising from cooking medium 38. Liquid level 100 schematically indicates a second liquid of lower density than cooking medium 38 (hence it floats on top of cooking medium 38) which is also at least partially vaporized by heating, with arrow 300 schematically indicating vapor rising from this second liquid. Vapor produced from cooking medium 38 (and also possibly from the second liquid) can percolate upwardly through the openings 39 in basket 31 and through holes or openings 37 in basket side wall 33. Heat, heated air, and heated vapor travels up through tube 22 bore 23 and some of this exits via the apertures or holes 26, thus transferring heat to the turkey carcass 40. Additionally, some interiorly heated vapor (from the interior 14 of pot 11 and/or interior of food item 40) can also enter bore 23 of tube 22 through one or more apertures or holes 26 (schematically indicated by arrow 270), which interiorly heated vapor is additionally heated by the heated vapor going through bore 23, and such superheated interiorly heated vapor again exits from other apertures or holes 26 in tube 22.

The turkey carcass 40 is thus cooked with the combination of steam that rises up through the openings 39 of basket 31 (schematically indicated by arrow 310 and possibly from second fluid at level 100 which is schematically indicated by arrow 300), and the heat that exits the apertures 26 of tube 22 (schematically indicated by arrows 200, 210, 220, 240, and 250). Arrows 240 and 250 schematically indicate the exiting of heat (e.g., convective heated vapor) respectively through openings or apertures 26' and 26". Arrows 260 and 265 schematically indicate the flow of the heat (convective heated vapor) around carcass or other poultry article 40. Although not expressly shown, some heat will exit through plurality of holes or apertures 26 which are within the vertical height of the turkey 40 which has been skewered by tube 22.

In the above fashion, a turkey carcass or other poultry article 40 can be cooked through a process of convective cooking and heated liquid vapor cooking without the use of expensive oil such as peanut oil.

Additionally, in the above fashion food, article 40 can be cooked from two directions: (1) from interior to exterior such as through heated vapor exiting holes or apertures 26 within the vertical height of the skewered food article; and exterior to interior from the heated gas/vapor from the interior 14 of pot 11 contacting the exterior of the food article 40. In one embodiment the cooking from the exterior to interior occurs throughout the entire height of the food article 40 as tube 22 goes through and exits food article 40.

In various embodiments, during the cooking process, the food article 40 can be spaced apart from the cooking medium 38. Dimension 120 in FIG. 12 schematically indicates this spacing apart. Spacing apart allows the a "partial steaming" of the food article 40.

In various embodiments, during the cooking process lid 28 can be vertically fixed relative to tube 22. Vertically fixing lid 28 can allow for a partial pressurizing of interior 14 of pot 11 during cooking. The amount of pressurization of interior 14 of pot 11 will be a function of:

(a) the heated temperature of interior 14 along with vapor from cooking medium 38;

(b) vapor loss between interior 14 to holes or apertures 26 in tube;

(c) exiting diameter of bore 23 and temperature/pressure of heated vapor in bore 23 of tube 22;

(d) possible pressure loss between lid 28 and edge 32.

In various embodiments a user may desire to increase the amount of heated vapor exiting tube 22 and entering interior 14 of pot 11. One option of doing this involves partially restricting the exit port or opening 24 from tube 22.

Figure 13:
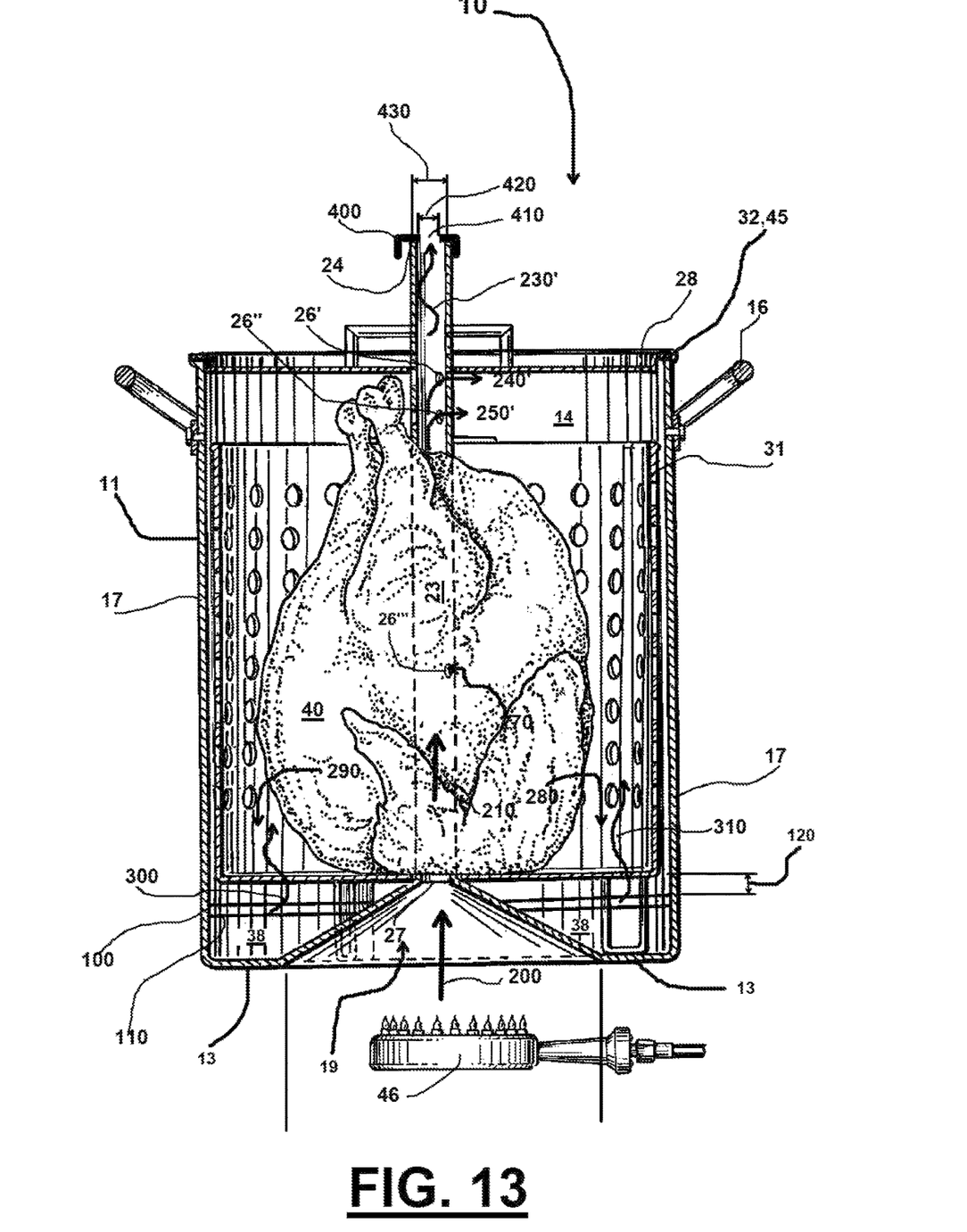
FIG. 13 is a schematic diagram illustrating an another embodiment of a method of cooking a food item with one embodiment of the apparatus using a partial restrictor on the tube bore.

In various embodiments flow through top 50 of tube bore 23 may be restricted. FIG. 13 is a schematic diagram illustrating an another embodiment of a method of cooking a food item with one embodiment of the apparatus using a partial restrictor 400 on the tube bore 23. Partial restrictor 400 can comprise a cap having an opening or orifice 410. Dimension 420 indicates the size of opening or orifice 410. Dimension 430 indicates the size of bore 23 of tube 22. In various embodiments the size 420 of opening or orifice can be about 2, 5, 10, 15, 20, 25, 30, 35, 40, 45, 50, 55, 60, 65, 70, 75, 80, 85, 90, 95, and/or 98 percent of the size 430 of bore 23 of tube 22. In various embodiments size 420 can be between any two of the above specified percentages of the size 430 of bore 23. Squiggly arrow 230' schematically indicates that flow through the top 50 of tube bore 23 is partially obstructed by restrictor 400, and arrows 240' and 250' schematically indicate that flow through holes or apertures 26' and 26" respectively are partially increased. Although not shown, flow through plurality of holes 26 within the height of skewered food article 40 can also be partially increased.

In various embodiments restrictor 400 can be detachably connected to tube 22 such as by threaded connections. In other embodiments restrictor 400 can merely sit on tube 22 and not be threadably connected—such sitting would provide some protection if the pressure inside tube bore 23 gets very high such high pressure would push off restriction 400 and allow the larger diameter dimension 430 of tube bore 23 to relieve such high pressure. In other embodiments, although not shown, restrictor 400 can be pivotally connected to tube 22 such that restrictor will pivot about an axis which is perpendicular to the central axis of tube bore 23.

Figure 14:
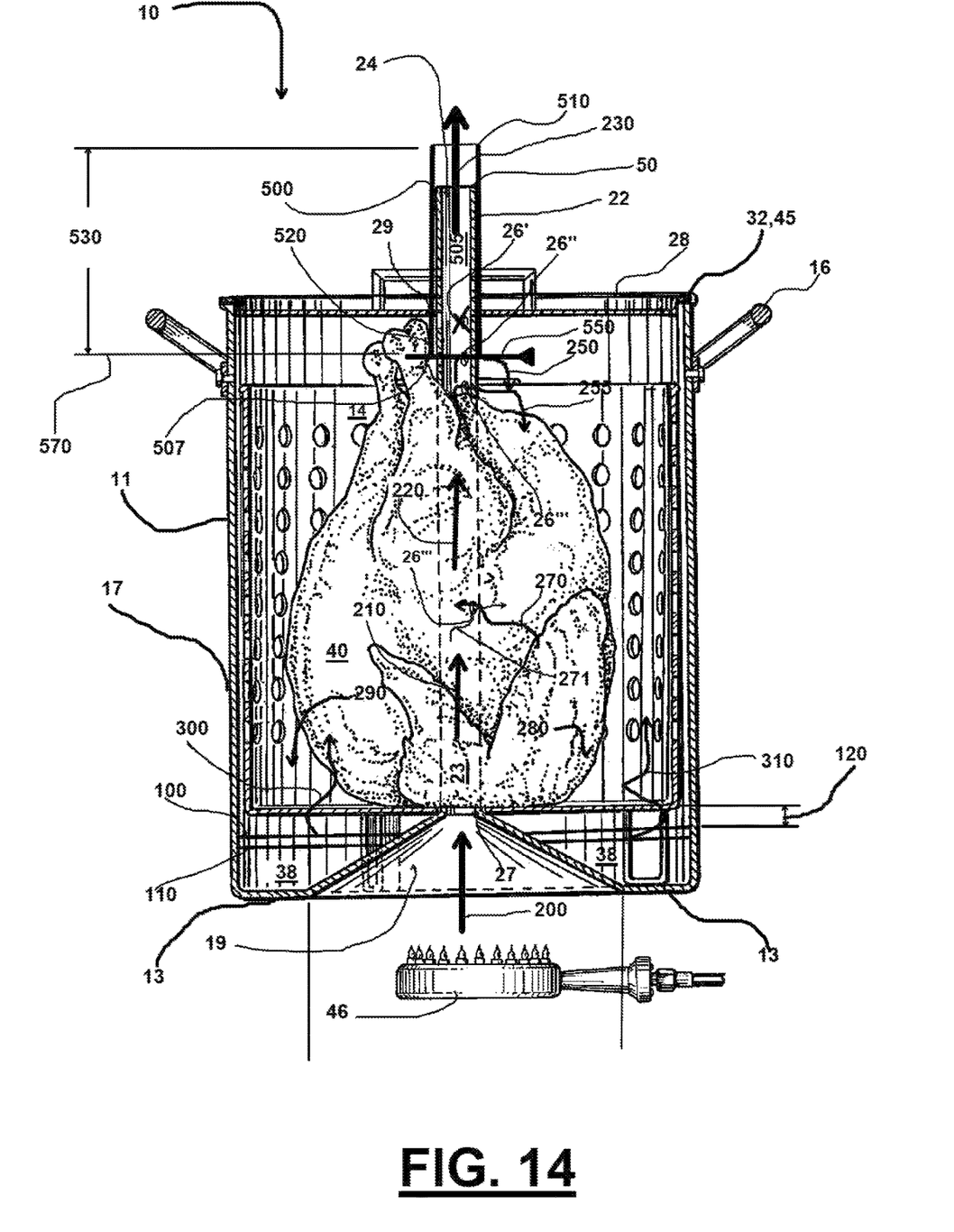
FIG. 14 is a schematic diagram illustrating an another embodiment of a method of cooking a food item with one embodiment of the apparatus using a restricting sleeve for restricting a selected subset of the plurality of openings in the tube.

In various embodiments a subset of the plurality of holes or apertures 26 in tube 26 can be restricted by a user by attaching a blocking sleeve 500 to tube 22 at a vertically selectable position. FIG. 14 is a schematic diagram illustrating an another embodiment of a method of cooking a food item 40 with one embodiment of the apparatus 10 using a restricting sleeve 500 for restricting a selected subset of the plurality of openings 26 in the tube 22. Sleeve 500 can comprise top 510, bottom 520 and have a height 530 with an internal bore 505. Preferably, internal bore 505 closely matches external dimension of tube 22 to prevent excess vapor loss between the two dimensions. Sleeve 500 can be set at a selected vertical height 570 by a user by simply inserting a sleeve support connector 550 in one of the selectable connection locations. In one embodiment, a first plurality of the plurality of openings or apertures 26 can each be used as a selectable vertical height selection. In this embodiment, sleeve connector 550 is simply inserted into the opening or aperture (e.g., aperture 26" in FIG. 14) at the user's selected vertical height. Holes or apertures 26 within the height 530 of sleeve 500 will be blocked (e.g., aperture 26'). Such blocking is believed to cause increased flow through the remaining holes or apertures 26 (e.g., hole 26" and the holes below bottom 520 of sleeve 500). Arrows 270 and 271 schematically indicate increased flow through one of the apertures 26'''.

In various embodiments the percentage of openings or apertures blocked by sleeve 500 can be about 2, 5, 10, 15, 20, 25, 30, 35, 40, 45, 50, 55, 60, 65, 70, 75, 80, 85, 90, 95, and/or 98 percent of the total plurality of openings or apertures 26 of tube 22 which are located in interior 14 of pot 11. In various embodiments the percentage of blocked openings can be between any two of the above specified percentages. In FIG. 14 flow arrows 250, 255, 270, and 271 schematically indicates increased flow in their respective openings compared to the amount of flow if sleeve 500 was not used.

In this alternative embodiment shown in FIG. 14 sleeve 500 actually traverses through opening 29 of lid 28. In this embodiment lid 28 can be detachably connectable to sleeve 500 such as by threading. In one embodiment sleeve 500 itself can include a pair of openings 507 which connector 550 passes through when being connected to tube 22 so that lid 28 can be kept from rising vertically during a cooking cycle. Here, sleeve 500 is vertically held in place by connector 550 passing through holes in sleeve 500 and simultaneously through the selected hole or apertures 26 in tube 22, and lid 28 is screwed onto sleeve 500. In the embodiment shown in FIG. 15 sleeve 500 does not pass through lid 28 and lid 28 is detachably connectable to tube 22 as discussed in this application.

Figure 15:
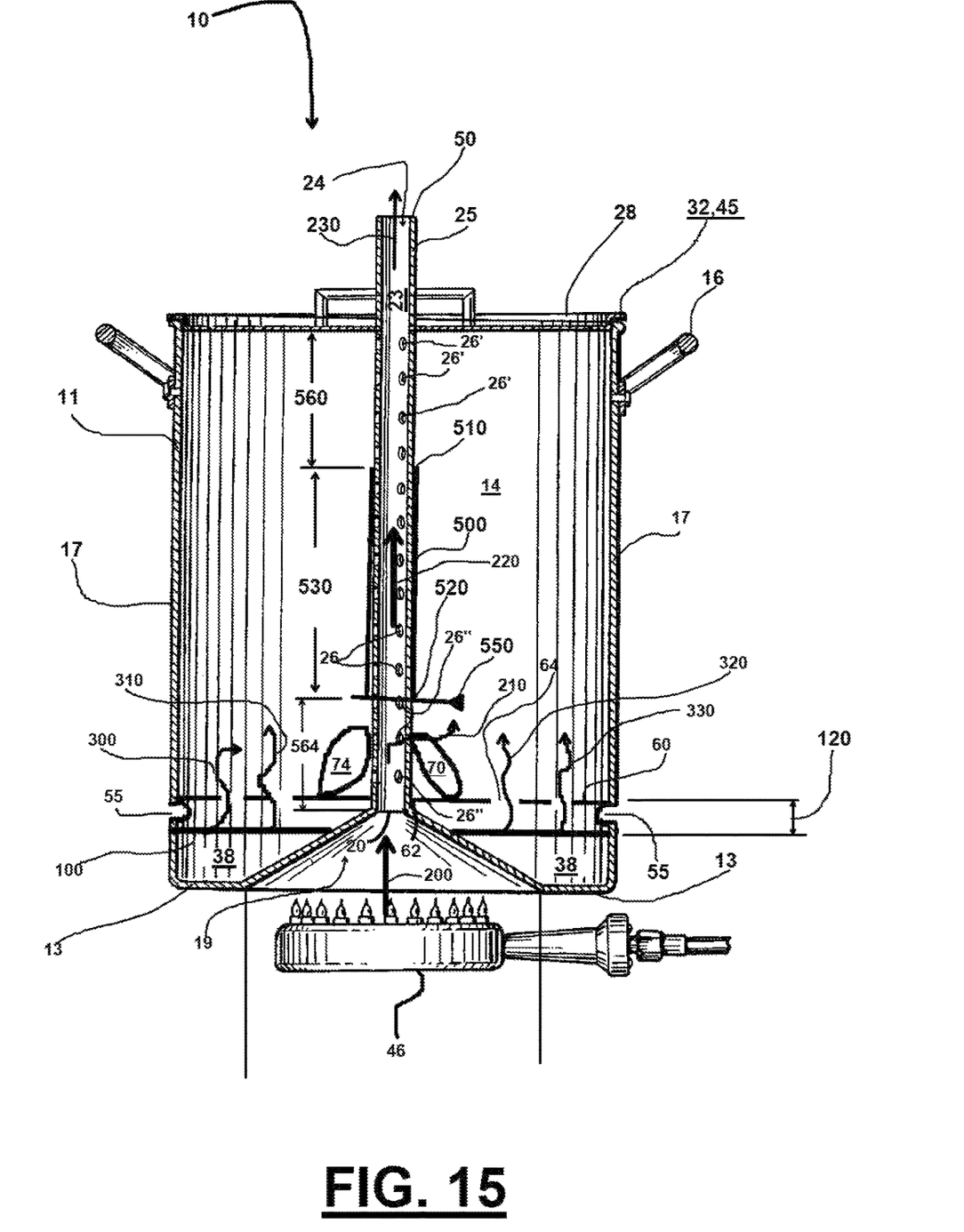
FIG. 15 is a schematic diagram illustrating an another embodiment of a method of cooking a food item with an alternative embodiment of the apparatus having a peripheral groove and steam plate with plurality of openings, along with using the restricting sleeve of FIG. 14 for restricting a selected subset of the plurality of openings in the tube.

FIG. 15 is a schematic diagram illustrating an another embodiment of a method and apparatus 10 for cooking a food item/article 70 and 74. This embodiment replaces basket 31 with a roasting or steaming plate 60. Steaming plate 60 includes a central opening 62 for sliding onto and off of tube 22, along with a plurality of steaming openings 64 that can allow for steam to rise up through the openings 64 of plate 60 (schematically indicated by arrows 320, 330). Steaming plate 60 can be slid over tube 22 and supported by peripheral groove 55 in pot 11. At the lower end portion 13 of pot 11 there is a provided an inwardly projecting annular shoulder or ridge 55. This inwardly projecting annular shoulder or ridge 55 can be formed by pressing the side wall 17 inwardly to produce to an annular groove. This annular shoulder or ridge 55 supports steaming or roaster plate 60.

Although not shown, steaming or roaster pan 60 can be fitted with a pair of vertical lifter members or rods. Each vertical lift member or rod can provide an upper end portion with eyelet. This enables a chef or cook or user to grab eyelets and lift the combination of roaster or steaming pan/plate 60 and food items 70,74 upwardly, removing them from pot 11 and tube 22. Lid 28 provides a central opening 29 that also enables tube 22 to pass through it.

In the roasting or steaming plate 60 embodiment, sleeve 500 is shown and can be set by a user at his selected vertical height by inserting sleeve support connector 550 in one of the selectable connection locations (i.e., opening 26"). Holes or apertures 26 within the height 530 of sleeve 500 will be blocked (e.g., aperture 26') during the method of cooking. Such blocking is believed to cause increased flow through the remaining holes or apertures 26" not blocked (i.e., holes 26' above the top 510 of sleeve 500 illustrated by dimension 560 and holes 26" below the bottom 520 of sleeve 500 illustrated by dimension 564). Dimension 564 extends from connection 20 to bottom 520 of sleeve 500. Arrow 210 schematically indicates increased flow through unblocked apertures 26" along dimension 564, thus transferring heat to food items 70, 74. In various embodiments with this embodiment, the percentage of openings or apertures blocked by sleeve 500 can be about 2, 5, 10, 15, 20, 25, 30, 35, 40, 45, 50, 55, 60, 65, 70, 75, 80, 85, 90, 95, and/or 98 percent of the total plurality of openings or apertures 26 of tube 22 which are located in interior 14 of pot 11. In various embodiments the percentage of blocked openings can be between any two of the above specified percentages.

In various embodiments the location of the restrictor/blocking sleeve 500 can be set at a vertically spaced apart distance from the top of the food item being cooked (e.g., 70 and 74) which can customize the amount and location of holes/openings/apertures located close to the top of the food item being cooked in which flow is allowed between the interior of tube shaped member 22 and the interior 14 of the pot during 11 cooking. In various embodiments with this embodiment, the percentage of openings or apertures located below sleeve 500 and above the food item being cooked (e.g., the higher of food items 70 and 74) can be about 2, 5, 10, 15, 20, 25, 30, 35, 40, 45, 50, 55, 60, 65, 70, 75, 80, 85, 90, 95, and/or 98 percent of the total plurality of openings or apertures 26 of tube 22 which are located in interior 14 of pot 11. In various embodiments the percentage of openings below sleeve 500 and above the food item being cooked can be between any two of the above specified percentages. In various embodiments the location of the restrictor/blocking sleeve 500 can be set and/or reset during cooking by positioning and/or relocating a sleeve support connector 550 in a first hole/opening/aperture 26" in the tube shaped member 22 and/or from the first hole/opening/aperture 26" to a second hole/opening/aperture (e.g., on of the holes/openings/apertures 26' in FIG. 15) In the tube shaped member 22.

Food items 70 and 74 can be a variety of food items including but not limited to vegetables, fish, roast, steak, turkey, chicken and other food items.

The following is a list of parts and materials suitable for use in the present invention:

PARTS LIST:

| PART NUMBER | DESCRIPTION |
| --- | --- |
| 10 | cooking apparatus |
| 11 | pot |
| 12 | upper end |
| 13 | lower end |
| 14 | interior |
| 15 | open top |
| 16 | handle |
| 17 | side wall |
| 18 | pot bottom |
| 19 | lower opening/concavity |
| 20 | connection |
| 21 | funnel section/tapered section |
| 22 | tube section |
| 23 | tube bore/interior |
| 24 | tube open top |
| 25 | tube wall |
| 26 | hole/opening/aperture |
| 27 | lower tube opening |
| 28 | lid/closure |
| 29 | opening |
| 30 | handle |
| 31 | basket |
| 32 | annular shoulder |
| 33 | basket side wall |
| 34 | basket bottom panel |
| 35 | central opening |
| 36 | leg |
| 37 | opening |
| 38 | liquid containing area below basket bottom/volume of liquid |
| 39 | opening |
| 40 | poultry article |
| 41 | length of leg/arrow |
| 42 | basket handle |
| 43 | arrow |
| 44 | arrow |
| 45 | pot rim |
| 46 | burner |
| 47 | fuel supply hose |
| 50 | top of tube |
| 55 | peripheral groove/annular shoulder/ridge |
| 60 | removable steaming plate |
| 64 | plurality of openings |
| 70 | food article/item |
| 74 | food article/item |
| 100 | second liquid level |
| 110 | first liquid level |
| 120 | space between food article and upper liquid level |
| 150 | diameter of pot |
| 160 | diameter of inner bore of tube |
| 170 | surface area of tube located in interior of pot |
| 175 | cross sectional area of openings or apertures |
| 200 | flow arrow |
| 210 | flow arrow |
| 220 | flow arrow |
| 230 | flow arrow |
| 240 | flow arrow |
| 250 | flow arrow |
| 255 | flow arrow |
| 260 | flow arrow |
| 265 | flow arrow |
| 270 | flow arrow |
| 271 | flow arrow |
| 280 | flow arrow |
| 290 | flow arrow |
| 300 | flow arrow |
| 310 | flow arrow |
| 320 | flow arrow |
| 330 | flow arrow |
| 400 | restrictor cap |
| 410 | orifice |
| 420 | size of orifice |

-continued

PARTS LIST:

| PART NUMBER | DESCRIPTION |
| --- | --- |
| 430 | diameter of tube |
| 500 | restrictor/blocking sleeve |
| 505 | bore |
| 510 | top |
| 520 | bottom |
| 530 | height |
| 550 | sleeve support connector |
| 560 | dimension |
| 564 | dimension |
| 570 | selected vertical position |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A turkey cooking apparatus, comprising:
   a) a pot having a top and a bottom, a bottom panel with an opening of a first bottom area, a pot side wall having a sidewall height, an interior, and an open top;
   b) the pot including a lower funnel shaped section attached to the bottom panel, the lower funnel shaped section having a funnel bore, the pot further including an upper tube shaped section connected to and extending above the lower funnel shaped section;
   c) wherein the lower funnel shaped section connects with the pot bottom panel at the opening of first bottom area;
   d) wherein the upper tube shaped section has a tube bore that is connected to the funnel bore, an upper tube discharge opening having a tube discharge area that is smaller than the opening of first bottom area;
   e) the pot further including a removable support with an opening that is receptive of the upper tube shaped section;
   f) wherein the upper tube shaped section having a tube wall with a plurality of spaced tube openings through the tube wall;
   g) a burner that supports the pot for transferring heat thereto at the pot bottom;
   h) wherein the pot having a cooking fluid holding section located in between the lower funnel shaped section and the pot side wall, and above the pot bottom and below the plurality of spaced tube openings;
   i) a lid having an opening that is receptive of the upper tube shaped section, wherein the upper discharge opening of the upper tube shaped section is located above the lid and outside of the interior of the pot when the lid is supported by the pot;
   j) wherein when the pot bottom is heated with the burner such that heated air flows from the opening of first diameter into the funnel bore, then to the tube bore and discharges through both
      (1) the plurality of spaced tube openings and
      (2) the upper tube discharge opening.

2. The apparatus of claim 1, wherein the lid is detachably connectable to the upper tube shaped section having a longitudinal axis, and when the lid is connected to the upper tube shaped section, relative motion in the direction of the longitudinal axis between the upper tube shaped section and the lid is prevented.

3. The apparatus of claim 2, wherein the combination of the removable support and turkey are removable together from the pot.

4. The apparatus of claim 1, wherein the upper tube shaped section includes a longitudinal axis and the plurality of spaced tube openings are spaced about the longitudinal axis, and further comprises a sleeve having a sleeve height, and the sleeve is adjustable relative to the upper tube shaped section along the longitudinal axis for selectably blocking different sets of spaced tube openings in the plurality of tube openings.

5. The apparatus of claim 4, wherein a sleeve support connector is insertable into different openings of the plurality of spaced tube openings for selecting different relative positions along the longitudinal axis for the sleeve relative to the upper tube shaped section.

6. The apparatus of claim 4, wherein the upper tube shaped member has a tube height and the sleeve is adjustable to adjust the tube height.

7. The apparatus of claim 4, wherein after adjustment, at least some of the plurality of spaced tube openings are located above and at least some of the spaced tube openings are located below the sleeve.

8. The apparatus of 44, wherein after adjustment at least 50 percent of the plurality of spaced tube openings are blocked by the sleeve.

9. A method of cooking a poultry food item, comprising the steps of:
(a) providing a cooker, the cooker having:
   (i) a pot having a bottom panel, a side wall having a sidewall height, an interior, an open top, and a bottom;
   (ii) the pot including a lower funnel shaped section attached to the bottom panel, the lower funnel shaped section having a funnel top and a funnel interior located between the bottom panel and the funnel top, the pot including an upper tube shaped section attached to the funnel top, the upper tube shaped section having a tube top, a tube bottom, a tube wall extending between the tube top and the tube bottom, a tube discharge opening located at the tube top, a tube interior located inside the tube wall, and a plurality of vertically spaced apart openings in the tube wall;
   (iii) a lid having a lid opening that is receptive of the upper tube shaped section, wherein the tube discharge opening of the upper tube shaped section being located above the lid and outside of the interior of the pot when the lid is supported by the pot; and
   (iv) a burner that supports the pot for transferring heat thereto at the bottom of the pot, the pot having a cooking fluid section that is above the bottom of the pot;
(b) inserting the poultry food item into the interior of the pot and wherein the tube discharge opening being located outside of the interior of the pot, and wherein the upper tube shaped section skewers the poultry food item;
(c) adding a cooking fluid into the pot interior;
(d) heating the pot bottom panel such that convective air currents are forced through the lower opening into the funnel interior, then to the tube interior, and exiting both:
   (1) at least one of the vertically spaced apart openings in the tube wall into the interior of the pot, and
   (2) the tube discharge opening; and
(e) heating the pot such that at least part of the cooking fluid is changed into vapor and exits the interior of the pot through the tube discharge opening.

10. The method of claim 9, wherein vapor from step "e" passes at least partly through the poultry food item being cooked before exiting the interior of the pot through the tube discharge opening.

11. The method of claim 9, further comprising the step of heating the poultry food item inserted in step "b" to create heated vapor originating from the poultry food item and exiting the interior of the pot through a plurality of the plurality of vertically spaced apart openings in the tube wall.

12. The method of claim 9, wherein the cooking fluid has a cooking fluid level that is below the poultry food item inserted in step "b".

13. The method of claim 9, wherein in step "a", above the lower funnel shaped section, the upper tube shaped section has a constant cross sectional area.

14. The method of claim 9, wherein in step "a", wherein the lid is detachably connectable to the upper tube shaped section having a longitudinal axis, and in step "d" relative motion in the direction of the longitudinal axis between the upper tube shaped section and the lid is prevented.

15. The method of claim 9, wherein in step "a", the upper tube shaped section includes a longitudinal axis, and further comprises a sleeve having a sleeve height, and the sleeve is slidingly adjustable relative to the upper tube shaped section along the longitudinal axis for selectably blocking different sets of the vertically spaced apart openings in the tube wall.

16. The method of claim 15, wherein a sleeve support connector is insertable into different openings of the vertically spaced apart openings of the tube wall for selecting different relative positions along the longitudinal axis for the sleeve relative to the tube shaped section.

17. The method of claim 15, wherein after step "b", the sleeve is placed over the tube shaped section and the poultry food item, such that the sleeve is blocking at least one of the vertically spaced openings in the tube wall where openings are located above the poultry food item.

18. He method of claim 15, wherein at least 25 percent of the vertically spaced openings in the tube wall are blocked by the sleeve.

19. The method of claim 15, wherein in step "a", the tube discharge opening has a first size and the tube shaped section includes an adjustable discharge opening restrictor and the restrictor adjusts the size of the discharge opening to a second size, the second size being within a range of between 50 and 100 percent of the first size, and during step "b" the discharge opening is restricted to the second size.

* * * * *